(12) United States Patent
Smout et al.

(10) Patent No.: US 11,867,345 B2
(45) Date of Patent: Jan. 9, 2024

(54) INSULATION MATERIAL (71) Applicant: PITTSBURGH CORNING EUROPE NV, Tessenderlo (BE)

(72) Inventors: Lucas Smout, Brasschaat (BE); Rudi Diepvens, Hechtel-Eksel (BE); Steven R. Badger, Pittsburgh, PA (US); Joseph Van Loo, Ronse (BE)

(73) Assignee: PITTSBURGH CORNING EUROPE NV, Tessenderlo (BE)

( * ) Notice: Subject to any disclaimer, the term of this patent is extended or adjusted under 35 U.S.C. 154(b) by 165 days.

(21) Appl. No.: 17/284,809

(22) PCT Filed: Oct. 14, 2019

(86) PCT No.: PCT/EP2019/077790
§ 371 (c)(1),
(2) Date: Apr. 13, 2021

(87) PCT Pub. No.: WO2020/078908
PCT Pub. Date: Apr. 23, 2020

(65) Prior Publication Data
US 2021/0388937 A1  Dec. 16, 2021

(30) Foreign Application Priority Data

Oct. 17, 2018 (EP) .................................. 18200982

(51) Int. Cl.
*F16L 59/07* (2006.01)
*B32B 1/08* (2006.01)
(Continued)

(52) U.S. Cl.
CPC ................ *F16L 59/07* (2013.01); *B32B 1/08* (2013.01); *B32B 3/30* (2013.01); *B32B 15/04* (2013.01);
(Continued)

(58) Field of Classification Search
CPC ......... F16L 59/147; F16L 59/12; F16L 59/06; F16L 59/07; F16L 59/024; B32B 3/30; B32B 2307/304; B32B 2597/00
(Continued)

(56) References Cited

U.S. PATENT DOCUMENTS 1,419,171 A * 6/1922 Read ....................... F16L 59/07
                                                                      138/148
1,519,694 A * 12/1924 Muessman .............. F16L 59/07
                                                                      138/173
(Continued)

FOREIGN PATENT DOCUMENTS

CN         106287113 A        1/2017
DE            4008603 A  *  11/1990  .............. F16L 59/04
(Continued)

OTHER PUBLICATIONS

Office Action from CN Application No. 201980066564.6 dated Nov. 24, 2022.
(Continued)

*Primary Examiner* — Patrick F Brinson
(74) *Attorney, Agent, or Firm* — Calfee, Halter & Griswold LLP (57) ABSTRACT

An insulation material comprising an insulation material substrate with a substrate surface, the insulation material further having a plurality of protrusions affixed to or integrated into substrate surface, each protrusion having an abutting surface distal to a protrusion base and a protrusion body connecting the abutting surface and the protrusion base, and each protrusion having an abutting surface height of at least 2 mm, wherein the abutting surface height is the shortest distance between the plane of the abutting surface and the plane of the protrusion base.

30 Claims, 3 Drawing Sheets

(51) Int. Cl.
  *B32B 3/30* (2006.01)
  *B32B 15/04* (2006.01)
  *B32B 15/18* (2006.01)
  *F16L 59/02* (2006.01)
  *F16L 59/12* (2006.01)

(52) U.S. Cl.
  CPC ............ *B32B 15/18* (2013.01); *F16L 59/024* (2013.01); *F16L 59/12* (2013.01); *B32B 2307/304* (2013.01); *B32B 2307/536* (2013.01); *B32B 2597/00* (2013.01)

(58) Field of Classification Search
  USPC .................................................. 138/148, 149
  See application file for complete search history.

(56) References Cited

U.S. PATENT DOCUMENTS

| | | | | |
|---|---|---|---|---|
| 1,542,427 A | * | 6/1925 | Wardell | F16L 59/07 428/443 |
| 2,037,813 A | * | 4/1936 | Munters | F16L 59/07 428/142 |
| 2,410,308 A | * | 10/1946 | Scharwath | F16L 59/12 138/149 |
| 3,157,204 A | | 11/1964 | Phillips | |
| 3,806,391 A | * | 4/1974 | Clay et al. | E04B 1/76 220/592.21 |
| 4,637,637 A | * | 1/1987 | Adorjan | F16L 59/12 285/55 |
| 5,585,154 A | | 12/1996 | Rhoades | |
| 7,069,956 B1 | * | 7/2006 | Mosier | F16L 11/20 138/124 |
| 2014/0120304 A1 | * | 5/2014 | Ghali | B32B 15/085 428/116 |
| 2015/0274390 A1 | * | 10/2015 | Ghali | B32B 27/34 428/116 |

FOREIGN PATENT DOCUMENTS

| | | | | |
|---|---|---|---|---|
| GB | 2079415 A | * | 1/1982 | ............ B65D 90/06 |
| GB | 2220459 A | | 1/1990 | |
| JP | S6060781 A | | 4/1985 | |
| JP | H04248098 A | | 9/1992 | |
| JP | 2001113618 A | | 4/2001 | |
| JP | 2013007436 A | | 1/2013 | |
| RU | 174634 U1 | | 10/2017 | |
| WO | 9801293 A1 | | 1/1998 | |
| WO | 92073082 A1 | | 9/2002 | |
| WO | 2014086332 A1 | | 6/2014 | |
| WO | 2014181684 A1 | | 11/2014 | |
| WO | 2015140221 A1 | | 9/2015 | |
| WO | 2016093716 A1 | | 6/2016 | |
| WO | 2017089558 A1 | | 6/2017 | |

OTHER PUBLICATIONS

Office Action and Search Report from RU Application No. 2021113641 dated Feb. 3, 2022.
Office Action from IN Application No. 202147020847 dated Aug. 24, 2022.
Office Action from CN Application No. 201980066564.6 dated Jun. 2, 2022.
Extended European Search Report from EP Application No. 18200982.9 dated Oct. 7, 2019.
International Search Report and Written Opinion from PCT/EP2019/ 077790 dated Jan. 24, 2020.
Office Action from CN Application No. 201980066564.6 dated Apr. 28, 2023.
Communication under Rule 71(3) EPC from EP Application No. 19784075.4 dated Jul. 3, 2023.
Office Action from CN Application No. 201980066564.6 dated Aug. 28, 2023.

* cited by examiner

INSULATION MATERIAL

CROSS-REFERENCE TO RELATED APPLICATIONS

This application is the U.S. national stage entry of International Application No. PCT/EP2019/077790, filed Oct. 14, 2019, which claims priority to and the benefit of European Application No. 18200982.9, filed Oct. 17, 2018, the entire contents of which are incorporated by reference herein.

FIELD OF THE INVENTION

The present invention relates to insulation material and methods of using the insulation material and particularly, although not exclusively, to insulation material, such as cellular glass, intended for use adjacent to corrodible surfaces.

BACKGROUND

Several components of a process plant, such as pipework, storage containers etc, are insulated with insulation materials to provide insulation to the component, such as thermal insulation. The insulation material typically abuts the component to be insulated. Such components are typically made of a corrodible material, such as steel.

Corrosion of steel occurs in the presence of oxygen and water. If water is trapped between the insulation material and the steel component being insulated, then corrosion of the steel component can occur. This is known as corrosion under insulation ("CUI").

Steel is in general susceptible to CUI in the temperature range of 0° C. to 175° C. The most frequently occurring types of CUI are:
  General and pitting corrosion of carbon steel, which may occur if wet insulation comes in contact with carbon steel; and
  External Stress Corrosion Cracking (ESCC) of austenitic stainless steel, which is a specific type of corrosion mainly caused by the action of water-soluble chloride.

CUI of carbon steel is possible under all types of insulation. The insulation type may only be a contributing factor. The insulation characteristics with the most influence on CUI are:
  Water-leachable salt content in insulation, such as chloride, sulphate and acidic materials that may contribute to corrosion;
  Water retention, permeability, and wettability of the insulation; and
  Foams containing residual compounds that react with water to form hydrochloric or other acids.

CUI is a product of wet metal exposure duration, and so the insulation system that holds the least amount of water and dries most quickly should result in the least amount of corrosion damage to equipment. Corrosion can be reduced by careful selection of insulation materials.

The corroded surface is mostly hidden by the insulation system and will not be observed until the insulation is removed for inspection or in the event of metal failure leading to incidents.

It is therefore desirable to provide insulation material systems that reduce CUI on corrodible components.

Figure 1:
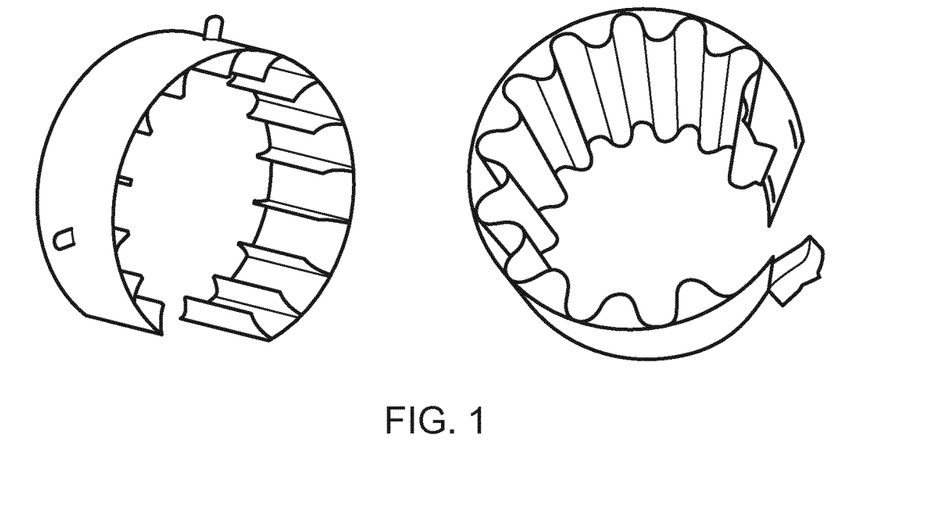
FIG. 1. shows examples of known spacer systems designed to be placed around a corrodible pipe before placing an insulation material over the pipe.

There are currently provided spacer systems that include a number of sleeves designed to be clipped over the external surface of the pipe. The sleeves have a hollow cylindrical shape with an annular outer part and fins or waves of material extending radially from the internal surface of the annular outer part towards the centre of the hollow cylinder. Air gaps are created between the fins or the waves of inwardly directed material. The pipe (which is to be insulated) is inserted into the hollow cylinder by a cut out section of the annular ring. In other words, the annular ring does not form a complete circle. The pipe abuts the inwardly directed fins or waves of material of the sleeve and the annular outer part surrounds the pipe and the waves or fins of material. Insulating material is then placed on the outside of the pipe and sleeves so that the insulation material abuts the outer surface of the annular outer part of the sleeve. In this way, an air gap is provided between the pipe and the insulation material. Examples of such systems are shown in FIG. 1. Both plastic and metal spacer systems have been used.

The systems above require separate assembly of the spacer system and the insulation material. Further, the systems may not be installed to give optimum CUI protection.

The present invention has been devised in light of the above considerations.

SUMMARY OF THE INVENTION

At its most general, the present invention provides an insulation material having a plurality of protrusions affixed to or integrated into an insulation material surface, the protrusion extending from the insulation material surface by at least 2 mm.

Accordingly, in a first aspect the present invention provides an insulation material comprising an insulation material substrate with a substrate surface, the insulation material further having a plurality of protrusions affixed to or integrated into substrate surface, each protrusion having an abutting surface distal to a protrusion base and a protrusion body connecting the abutting surface and the protrusion base, and each protrusion having an abutting surface height of at least 2 mm, wherein the abutting surface height is the shortest distance between the plane of the abutting surface and the plane of the protrusion base.

In this way, the insulation material has an integrated spacer system for creating an air gap of at least 2 mm between the substrate surface and the corrodible surface to allow flow of, for example, water away from the corrodible surface.

In a second aspect, the present invention provides an insulated component comprising a component with a corrodible outer surface and an insulation material according to the first aspect, wherein the abutting surface of the protrusions of the insulation material abut the corrodible outer surface of the component to provide an air gap of at least 2 mm between the corrodible outer surface and the substrate surface of the insulation material substrate.

In a third aspect, the present invention provides a method for producing the insulation material of the first aspect, wherein the method comprises the following steps:
  1) Providing an insulation material substrate with a substrate surface; and
  2) Affixing a plurality of protrusions to the substrate surface, each protrusion having an abutting surface distal to a protrusion base and a protrusion body connecting the abutting surface and the protrusion base, the protrusion base of each protrusion being affixed to the substrate surface, and each protrusion having an abutting surface height of at least 2 mm, wherein the abutting surface height is the shortest distance between the plane of the abutting surface and the plane of the protrusion base.

In a fourth aspect, the present invention provides a method of producing an insulated industrial component of the second aspect, the method including the step of affixing one or more insulation materials of the first aspect to an outer corrodible surface of an industrial component.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Protrusions

The protrusions of the insulation material described herein are affixed to or integral with the substrate surface of the insulation material surface. Typically, the protrusions have a protrusion base affixed to or integral to the substrate surface of the insulation material substrate, and a protrusion body extending from the protrusion base to an abutting surface of the protrusion.

The abutting surface of the protrusion is adapted to abut a corrodible surface. In this way, the protrusions may abut a corrodible surface of a component, such as a steel surface, and an air gap between the corrodible surface and the insulation material substrate is provided.

Abutting Surface Height

The abutting surface height may determine the air gap that is created between the corrodible surface and the insulation material substrate when the insulation material described herein is used to insulate a component with a corrodible surface.

The abutting surface height is at least 2 mm. The abutting surface height is shortest distance from the abutting surface to the protrusion base.

In particular embodiments, the plane of the abutting surface is substantially parallel to the plane of the protrusion base. In this way, the shortest distance between the abutting surface and the protrusion base is substantially uniform for all points on the abutting surface. In these embodiments, the shortest distance between the plane of the abutting surface and the protrusion base defines the abutting surface height.

In this way, an air gap of at least 2 mm between the insulation material substrate and the corrodible surface is created when the (or at least part of the) abutting surface abuts the corrodible surface. The air gap provides a way for moisture, excess water or any other liquid that may contribute to corrosion under insulation (CUI) to be removed from between the insulation material substrate and the corrodible surface.

In some embodiments, the abutting surface height is in the range of 2 mm to 30 mm. In particular embodiments, the abutting surface height is in the range of 5 to 20 mm. In more particular embodiments, the abutting surface height is in the range of 10 to 15 mm. In yet further embodiments, the abutting surface height is around 11, 12 or 13 mm.

In alternative embodiments, the shortest distance between the abutting surface and the protrusion base varies across the abutting surface. The shortest distance between the abutting surface and the protrusion base defines the minimum abutting surface height. The minimum abutting surface height is typically at least 2 mm. In some embodiments, the minimum abutting surface height is in the range of 2 mm to 30 mm. In particular embodiments, the minimum abutting surface height is in the range of 5 to 20 mm. In more particular embodiments, the minimum abutting surface height is in the range of 10 to 15 mm. In yet further embodiments, the minimum abutting surface height is around 11, 12 or 13 mm.

Dimensions of the Protrusion Base and Abutting Surface

The length and width of the abutting surface are not particularly limited, as long as a sufficient surface is provided to abut a corrodible surface. Similarly, the length and width of the protrusion base are not particularly limited, as long as a sufficient surface is provided to affix to or be integral with a substrate surface of the insulation material substrate.

The abutting surface may have a length in the range of 5 to 50 mm. In particular embodiments, the abutting surface has a length in the range of 8 to 25 mm. In more particular embodiments, the abutting surface has a width of 10 to 20 mm. In yet more particular embodiments, the abutting surface has a length in the range of 12 to 15 mm. In one embodiment, the abutting surface has a length in the range of 13 to 14 mm.

The abutting surface may have a width in the range of 2 to 25 mm. In particular embodiments, the abutting surface has a width in the range of 4 to 15 mm. In more particular embodiments, the abutting surface has a width of 5 to 10 mm. In yet more particular embodiments, the abutting surface has a width in the range of 6 to 8 mm. In one embodiment, the abutting surface has a width of in the range of 6.5 to 7 mm.

In some embodiments, length of the abutting surface is greater than the width of the abutting surface. In some embodiments, the ratio of the length to the width of the abutting surface is in the range of 1.1:1 to 3:1. In particular embodiments, the ratio of the length to the width of the abutting surface is in the range of 1.5:1 to 2.5:1. In more particular embodiments, the ratio of the length to the width of the abutting surface is in the range of 1.8:1 to 2.2:1. In one embodiment, the length of the abutting surface is approximately twice the width of the abutting surface.

The protrusion base may have a length in the range of 5 to 100 mm. In particular embodiments, the protrusion base has a length in the range of 8 to 50 mm. In more particular embodiments, the protrusion base has a width of 10 to 30 mm. In yet more particular embodiments, the protrusion base has a length in the range of 15 to 25 mm. In one embodiment, the protrusion base has a length in the range of 20 to 23 mm.

The protrusion base may have a width in the range of 2 to 50 mm. In particular embodiments, the protrusion base has a width in the range of 4 to 30 mm. In more particular embodiments, the protrusion base has a width of 5 to 20 mm. In yet more particular embodiments, the protrusion base has a width in the range of 6 to 15 mm. In one embodiment, the protrusion base has a width of in the range of 11 to 13 mm.

In some embodiments, the length of the abutting surface is approximately the same of as the length of the protrusion base. In additional or alternative embodiments, the width of the abutting surface is approximately the same of as the width of the protrusion base. In particular embodiments, the length and/or the width of the protrusion base is greater than the length and/or width, respectively, of the abutting surface.

Surface Area of the Protrusion Base and the Abutting Surface

The surface area of the protrusion base is not particularly limited, although the total surface area of the protrusion bases of the plurality of protrusions may not be more than 50% of the surface area of the substrate surface of the insulation material substrate. Similarly, the surface area of the abutting surface is not particularly limited, although the total surface area of the abutting surfaces of the plurality of protrusions may not be more than 50% of the surface area of the substrate surface of the insulation material substrate. In this way, at least 50% of the surface area of the substrate surface of the insulation material substrate is provided with an air gap between the corrodible surface and the insulation material substrate when installed on a corrodible surface of an industrial component.

For each protrusion, the surface area of the protrusion base may be the same, less than or greater than the area of the abutting surface. The surface area of the protrusion base may be in the range of 100 to 1000 $mm^2$. The surface area of the abutting surface may be in the range of 100 to 1000 $mm^2$.

In particular embodiments, the surface area of the abutting surface is less than the surface area of the protrusion base. In this way, the protrusion base supports the insulation material substrate while minimising the contact between the corrodible surface and the protrusion. In these embodiments, the surface area of the abutting surface may be in the range of 100 to 500 $mm^2$ and the surface area of the protrusion base may be in the range of 200 to 750 $mm^2$. In particular embodiments, the surface area of the abutting surface is in the range of 150 to 300 $mm^2$ and the surface area of the protrusion base may be in the range of 300 to 700 $mm^2$.

Shape of the Protrusion Base and the Abutting Surface

The shape of the protrusion base is not particularly limited. For example, the protrusion base may have a circular, elliptical, crescent, oval, triangular, quadrilateral (e.g. square, rectangular, rhombus, rhomboid, oblong), pentagonal, hexagonal, heptagonal, octagonal, a polygon nine or more sides, or an irregular shape. In particular embodiments, the shape of the protrusion base is circular, oval, ellipse, square or rectangular.

The shape of the abutting surface is not particularly limited. For example, the abutting surface may have a circular, elliptical, crescent, oval, triangular, quadrilateral (e.g. square, rectangular, rhombus, rhomboid, oblong), pentagonal, hexagonal, heptagonal, octagonal, a polygon nine or more sides, or an irregular shape. In particular embodiments, the shape of the abutting surface is circular, oval, ellipse, square or rectangular.

In some embodiments, the shape of the protrusion base is the same as the shape of the abutting surface. For example, the shapes of the protrusion base and the abutting surface may be selected from the group consisting of circular, oval, ellipse, square or rectangular. In a particular embodiment, the abutting surface and the protrusion base have elliptical shapes.

Protrusion Body

The protrusion base and abutting surface of the protrusion are connected by a protrusion body. The protrusion body typically has the protrusion base at one face and the abutting surface at another face. The protrusion base and the abutting surface may be on opposing faces of the protrusion body. One or more protrusion body side walls may extend from an outer edge of the abutting surface and/or an outer edge of the protrusion base. The protrusion body side wall or walls may define the outer limits of the protrusion body. In some embodiments, the protrusion body is a solid body of material with the outer faces of the solid body defined by the side wall or walls. In alternative embodiments, the protrusion body includes a protrusion body cavity.

The shape of the protrusion body is not particularly limited. The shape and/or surface area of the protrusion body may be determined by the shape of the protrusion base and/or the abutting surface. For example, where the abutting surface and protrusion base both have an elliptical shape, the protrusion body may have an elliptical cylinder shape (where the abutting surface and the protrusion base have substantially the same surface area) or a truncated cone shape with an elliptical cross-section (where the abutting surface and the protrusion base have different surface areas). Equally, the protrusion body may have a mixture of shaped sections. For example, the protrusion body may have cylindrical section adjacent to the abutting surface and/or the protrusion base and a truncated cone section between the cylindrical sections or between the cylindrical section and the protrusion body or abutting surface.

In particular embodiments, one or more protrusion body side walls extend from an outer edge of the abutting surface and an outer edge of the protrusion base, and the abutting surface has one or more smaller dimensions (e.g. length, width and/or surface area) than the protrusion base. In these embodiments, the protrusion side wall or side walls may be sloped with respect to the abutting surface and protrusion base. In other words, the protrusion body side walls are not perpendicular to the abutting surface and/or the protrusion base.

In particular embodiments, the protrusion body tapers from the protrusion base to the abutting surface. In this way, liquid, such as water, may easily escape from the interface of the abutting surface and the corrodible surface. In particular embodiments, the protrusion body tapers at an angle of at least 105° with respect to the plane of the abutting surface. In more particular embodiments, the protrusion body tapers at an angle between 105 to 135° with respect to the plane of the abutting surface. In even more particular embodiments, the protrusion body tapers at an angle between 105° and 115° with respect to the plane of the abutting surface.

In some embodiments, the protrusion body may be of the same material as the insulation material substrate. In these embodiments, the protrusions may be integral with the insulation material substrate. In other words, the protrusions and insulation material substrate form a single body.

In particular embodiments, the protrusion body is formed of a different material to the insulation material substrate. In this way, the protrusions may have different physical properties, such as density and deformability, to the insulation material substrate.

In particular embodiments, the protrusion body has a density of 0.85 g/cm$^3$ or more. In particular embodiments, the protrusion body has a density of 1.05 g/cm$^3$ or more. In some embodiments, the protrusion body has a density of 2.3 g/cm$^3$ or less. The density of the protrusion body may be in the range of 0.85 g/cm$^3$ to 2.3 g/cm$^3$. In particular embodiments, the density of the protrusion body is in the range of 1.05 g/cm$^3$ to 1.8 g/cm$^3$.

In particular embodiments, the protrusion body is of a polymer, elastomer or rubber material. In particular embodiments, the protrusion body may be of a silicon-based polymer, elastomer or rubber material. In a particular embodiment, the protrusion body is of silicone rubber.

When the protrusion body is of a polymer, elastomer or rubber material, the polymer, elastomer or rubber material may have a Shore A indentation hardness of at least 25. In these embodiments, the polymer, elastomer or rubber material may have a Shore A indentation hardness of at least 30. In these embodiments, the polymer, elastomer or rubber material may have a Shore A indentation hardness of 70 or less. In particular embodiments, the polymer, elastomer or rubber material may have a Shore A indentation hardness of 50 or less. In particular embodiments, the polymer, elastomer or rubber material may have a Shore A indentation hardness in the range of 30 to 50. In this way, the material has a balance of hardness and flexibility. Shore A hardness is measured according to ASTM D2240. When the protrusion body is of another material, the protrusion body material may have the equivalent to a Shore A hardness as specified above.

In some embodiments, the protrusion body is of a material having a functional temperature range including the range of −10° C. to 100° C. Functional temperature range as used herein refers to the temperature range over which the material generally maintains its physical properties. In particular embodiments, the protrusion body is of a material having a functional temperature range including the range of −20° C. to 150° C. In a particular embodiment, the protrusion body is of a material having a functional temperature range including the range of −50° C. to 200° C.

The protrusions may be affixed to the substrate surface using an adhesive. The adhesive may be any adhesive that is compatible for the insulation material substrate and the protrusion material. For example, the insulation material may include a layer of a silicone-based adhesive between a silicone rubber protrusion body and the insulation material substrate.

In particular embodiments, the protrusion body is a moulded component. In other words, the protrusion body is made from a moulding process, such as injection moulding or extrusion moulding.

In particular embodiments, the protrusion body, protrusion base and abutting surface are a single moulded component. In more particular embodiments, the protrusion is a single moulded component. In this way, the plurality of protrusions may be easily manufactured.

Spacing of Protrusions

The insulation material comprises a plurality of protrusions protruding from the surface of the insulation material substrate. The protrusions may be spaced on the surface in any arrangement.

In particular embodiments, the protrusions are arranged on the surface of the insulation material substrate in an array. In other words, the protrusions may be arranged on the surface in a systematic arrangement or set pattern.

In some embodiments, the protrusions are arranged in rows and columns on the surface of the insulation material substrate. In some embodiments, each column of each row of protrusions is aligned along the same axis. In alternative embodiments, the columns of each alternate row are offset from the columns of the previous row.

In some embodiments, two or more protrusions are spaced apart on the substrate surface of the insulation material substrate by at least 10 mm. In particular embodiments, two or more protrusions are spaced apart in the range of 10 to 200 mm. In more particular embodiments, two or more protrusions are spaced apart in the range of 50 to 175 mm. In yet more particular embodiments, two or more protrusions are space apart in the range of 100 to 150 mm. In one particular embodiment, two or more protrusions are spaced apart in the range of 110 to 130 mm, for example, about 120 mm apart.

The density of protrusions on the substrate surface of the insulation material substrate may be in the range of around 1 protrusion per 1,000 to 100,000 mm$^2$. In particular embodiments the density of protrusions on the substrate surface of the insulation material substrate is in the range of 1 protrusion per 4,000 to 40,000 mm$^2$. In more particular embodiments, the density of protrusions on the substrate surface of the insulation material substrate may be in the range of 1 protrusion per 10,000 to 20,000 mm$^2$. In yet more particular embodiments, the density of protrusions on the substrate surface of the insulation material substrate is in the range of 1 protrusion per 14,000 to 15,000 mm$^2$.

Insulation Material Substrate

The insulation material described herein includes an insulation material substrate. The type of insulation material forming the insulation material substrate is not particularly limited as CUI affects all types of insulation material.

In particular embodiments, the insulation material substrate is selected from the group consisting of expanded polystyrene (EPS), extruded polystyrene (XPS), foamed polyurethane (PU), expanded polyisocyanurate (PIR), urea formaldehyde foam insulation, spray foam insulation (e.g. Icynene® foam, a two component PU foam composition that may be sprayed shortly or immediately after mixing the A (isocyanate) and B (polyol containing) components on-site), expanded perlite foam, cellular concrete, also known as aerated concrete, lightweight aerated concrete, variable density concrete, foam concrete, e.g. the so-called "aerated concrete", for instance Multipor® or Ytong®, or aerated autoclave concrete, and cellular ceramic materials, such as cellular glass.

In particular embodiments, the insulation material substrate is cellular glass insulation substrate, also known as glass foam material (e.g. FOAMGLAS® material). This insulation material is, factory made, compliant with standards EN 13167, EN 14305, ASTM C552. Cellular glass may readily offer a thermal conductivity of less than 0.065 W/m·K, a compressive strength of at least 0.4 N/mm$^2$, and complies with a class A1-fire reaction, meaning it is non-combustible.

In another embodiment, the insulation material substrate has a cellular structure with an average cell diameter in the range of 0.1-5.0 mm, preferably at least 0.2 mm, more preferably at least 0.3 mm, even more preferably at least 0.4 mm, yet more preferably at least 0.5 mm. In an embodiment the average cell diameter is at most 4.0 mm, preferably at most 3.0 mm, more preferably at most 2.5 mm, even more preferably at most 2.0 mm, yet more preferably at most 1.7 mm.

The applicants determine the average cell diameter d of a cellular product according to the following procedure. A sample comprising a 10×10 cm area of the surface to be coated should be taken from the insulation material. The sample should be taken from the centre of the insulation material, i.e. at maximum distance of each border.

The cells of the foamed product are about spherical when they are formed, ideally taking a tetrakaidecahedral form, i.e. a regular 3D shape delimited by 8 hexagonal face and 6 quadrilateral faces. When the cell is cut, its cross-section would be about circular. Several effects during the insulation material manufacturing process, may result in elongation or deformation of the cells in one or more directions. The cell cross sections may thus deviate from about circular, forming a shape with a longer axis being perpendicular to a shorter axis.

Cell diameters should be measured on the surface to be coated, preferably under a microscope, with an optical magnification of at least 20×. In such a microscopic view or picture, when in doubt, may be determined an average cell diameter in a first direction giving about the highest diameter, and the average cell diameter in a second direction which is perpendicular to the first direction. A ratio of the two average cell diameters may then be determined by dividing the smallest average cell diameter by the largest one.

In the context of the present invention, the average cell diameter d of a sample of cellular ceramic material should be determined in a plane coinciding with the surface to be coated. The average cell diameter "d" should be determined by counting how often a section of a straight line of at least 3.0 cm long crosses a cell wall on a microscope picture. If the microscope picture is not large enough to host a 3.0 cm line section, several microscope pictures may need to be stitched together using appropriate software in order to obtain a microscopic picture representing a cellular ceramic sample of at least 3.0 cm long. The average cell diameter is then computed using formula (I):

$$d=L/(0.785^2*N)=L/(0.616*N) \quad (I)$$

wherein
- d is the average cell diameter (in mm, with 10 micrometers significance or better)
- L is the length of the line section crossing the cell walls in the microscope picture (expressed in mm, but measured to an accuracy of 10 micrometers or better), and
- N is the number of times the line section intersects cell walls along its length L. In the context of the present invention, this number should be at least 40, else a longer line needs to be selected, or additional measurements (additional lines whose intersections are counted) need to be performed on another part of the sample that has no cells in common with the first line(s).

The factor 0.785 is computed as the rounded result of $\pi/4$, conform what is described in Appendix X1 of ASTM D3576-15, i.e. the relation between the average chord length and the average cell diameter. The factor 0.616 is the square of the factor 0.785 rounded to the same precision.

In the context of the present invention, a cell wall is defined as the material boundary separating two cells. However, bubbles may be present in a cell wall. If a line crosses a bubble, the cell wall surrounding the bubble should be counted as one cell wall, not two. A cell is therefore defined in the context of the present invention as a void having more than 3 neighbours. A cell usually has a non-spherical geometry, because "corners" are formed where three cells meet each other. Ideally the shape of a cell is a tetrakaidecahedron, or related. A bubble has only 3 or less neighbours and is typically almost fully spherical or ellipsoid in shape, usually having no "corners".

For elongated cells, the cell may be conceived as an ellipsoid rather than a sphere. The measurement stated above should be performed in two directions: once along the predominant long axis of the cells, and once along the predominant short axis of the cells. Applying formula (I) will give the length of the long axis (a) for the former measurement, and the length of the ellipsoid short axis (b) for the latter. An equivalent circular diameter can then be computed as $$d=\sqrt{(a*b)}$$

Typically, this measurement is repeated at least once, more particularly at least twice, even more particularly at least three times, yet more particularly at least 5 times on the same surface of the sample, the line sections being drawn at different locations on the sample surface, at least 2*d (with d as defined in formula I) apart from each other. The inventors typically work with a sample having a 10×10 cm surface area of the surface to be coated. The inventors typically divide the sample surface to be used for the cell diameter determination into 9 areas of about the same size by drawing a rectangular raster on the surface which divides each surface border in 3 parts of about the same size. The single central area is then labelled A, the 4 side areas bordering the area A are labelled B, and the 4 remaining corner areas are labelled C. The inventors typically draw one line section having the length L in each of the 9 areas. The inventors typically use all 9 measurements. For simplicity, the measurements for areas A and B may be used, or if sufficiently differentiating the result for area A only, but the inventors consider the combination of the 9 measurements as the ultimately governing result. The individual results d, of each of the n individual measurements should then be averaged mathematically over all n measurements, in order to obtain the average cell diameter d for the sample.

In some embodiments, the insulation material substrate has a solid space representing at least 2% and at most 10% of the slab volume, preferably at least 3%, more preferably at least 4%. In one embodiment, the insulation material substrate has a solid space representing at most 9% of the slab volume, particularly at most 8%, more particularly at most 7% and even more particularly at most 6%. The applicants have found that limiting the solid space of the insulation to at most the upper limit as specified, contributes to the excellent insulating properties of the insulation material substrate.

The shape of the insulation material substrate is not particularly limited. Typically, the shape of the insulation material substrate compliments the shape of the component to be insulated. For example, the insulating material substrate may be a planar slab of insulation material. Such a shape may be used to insulate a planar corrodible surface, such as a wall, of a component. Alternatively, the insulating material substrate is a hollow cylinder or part thereof. Such insulation material substrate is suitable for insulating cylindrical pipes with a corrodible outer surface. The insulation substrate may be provided as two halves of a hollow cylinder. In this way, the two halves may be easily assembled around the pipe to be insulated. The hollow cylindrical insulation material substrate may be divided into more than two parts for easy installation. For example, the insulation material substrate may be provided as three thirds, four quarters, five fifths, or six sixths of a hollow cylinder.

The inner diameter of a hollow cylinder insulation material substrate (or part thereof) may be the outer diameter of the component to be insulated plus the maximum height of the protrusions of the insulation material. In this way, the insulation material substrate fits around the pipe without significant compression of the protrusions.

The hollow cylinder insulation material substrate may be straight, curved or have a mix of sections with different curves or a mixture of straight sections and curved sections. The shape of the insulation material is typically dictated by the shape of the component to be insulated.

Particular Embodiments

In particular embodiments, the present invention provides an insulation material comprising a cellular glass insulation material substrate with a substrate surface, the insulation material further having a plurality of silicone rubber protrusions affixed to the substrate surface, each protrusion having an abutting surface distal to a protrusion base and a protrusion body connecting the abutting surface and the protrusion base, and each protrusion having an abutting surface height in the range of 5 to 15 mm, wherein the abutting surface height is the shortest distance between the plane of the abutting surface and the plane of the protrusion base.

In more particular embodiments, the surface area of the abutting surface is less than the surface area of the protrusion base and a side wall or side walls of the protrusion body taper from the protrusion base to the abutting surface at an angle of at least 105°. In particular embodiments, the side wall or side walls of the protrusion body taper from the protrusion base to the abutting surface at an angle between 105 to 135° with respect to the plane of the abutting surface. In more particular embodiments, the side wall or side walls of the protrusion body taper from the protrusion base to the abutting surface at an angle between 105° and 115°.

Method of Producing Insulation Material

Described herein is a method of producing the insulation material described herein. The method includes the step of affixing a plurality of protrusions as described herein to the substrate surface of the insulation material substrate. The protrusion base typically is affixed to the substrate surface.

In some embodiments the protrusions are affixed to the substrate surface with an adhesive. As such, the method may include a step of providing a layer of adhesive on the protrusion base and/or the substrate surface before affixing the protrusion to the substrate surface. The adhesive, when used, may be any adhesive that adheres the protrusion to the substrate surface. When the protrusion base forms a face of the protrusion body and is made of a silicone rubber, the adhesive may be a silicone adhesive.

Component to be Insulated

The insulation material described herein is typically applied to a component with a corrodible surface so that the component is insulated. In particular embodiments, the corrodible surface is a steel surface. The component may be a pipe, storage container, or a girder. In particular embodiments, the component is a pipe. When the component is a pipe, the insulation material may be two half-pipe sections adapted to fit around the pipe and be secured together. In this way, the insulation material may be easily fitted to the pipe.

The insulated component may include one or more insulation material fixings for affixing the insulation material to the component. In some embodiments, the insulation material fixing may be an adhesive on the abutting surface. Such an adhesive may be any adhesive that adheres the abutting surface of the protrusions to the corrodible surface of the component. The insulation material fixing may be a clamp, clip or tie adapted to fit around insulation material to hold it in place. For example, the insulated component may include a steel pipe with two half-pipe sections of insulated material on the outer surface of the pipe and a metal cable tie encircling the insulation material and pipe.

Method of Insulating the Component

A method of insulating a component with the insulation materials is described herein. The method includes affixing one or more insulation materials as described herein to the component. The method may include affixing the insulation material with one or more insulation material fixings as described herein. In some embodiments, the method includes a step of applying an adhesive to the corrodible surface and/or the abutting surface of the insulation material before affixing the insulation material to the component. In some embodiments, the method includes a step of placing the insulation material adjacent to the corrodible surface of the component and then using an insulation material fixing (such as a clamp, clip or tie) to affix the insulation material to the component.

Turning to the Figures, FIG. 1 shows two known sleeves designed to fit around a steel pipe to avoid CUI.

Figure 2:
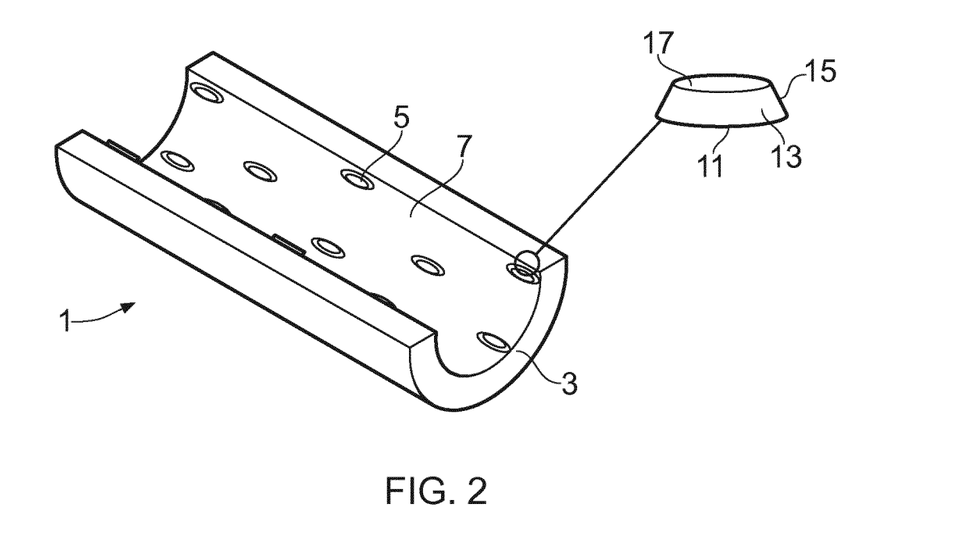
FIG. 2. shows a representation of an insulation material described herein.
Figure 3:
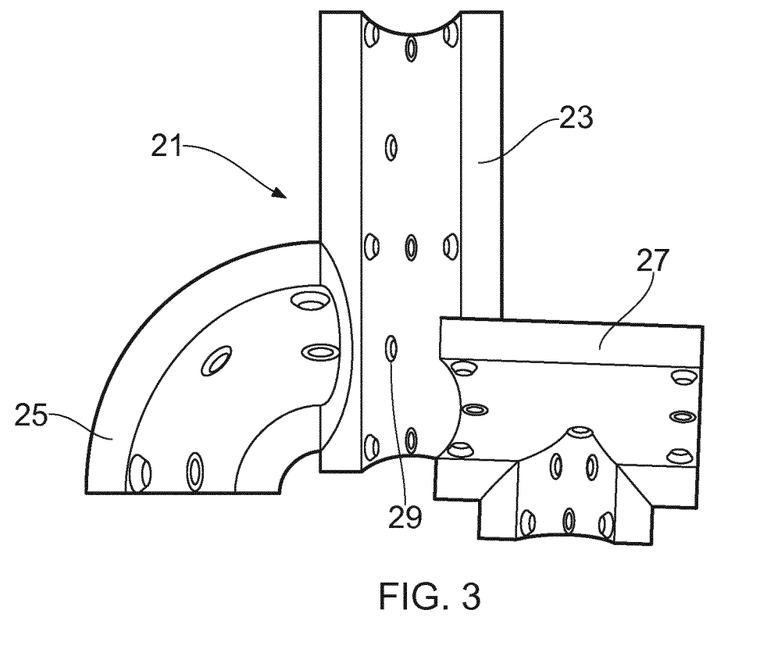
FIG. 3. shows a representation of another insulation material described herein.

FIGS. 2 and 3 show exemplary embodiments of the insulation material 1 of the present invention. FIG. 2 shows a half-pipe section of cellular glass insulation material substrate 3. The section shown is approximately 600 mm in length. A number of silicone rubber protrusions 5 are glued to the inner surface 7 of the substrate using a silicone-based adhesive. The protrusions are arranged in five rows of protrusions along the length of the half-pipe. Each row is approximately 120 mm apart. Rows 1, 3 and 5 include three protrusions per row and rows 2 and 4 include two protrusions. The protrusions in rows 2 and 4 are off-set from the protrusions in rows 1, 3 and 5.

A more detailed view of one of the protrusions is shown in FIG. 2. Each protrusion is formed as a single body. The protrusion has a substantially planar protrusion base 11 for affixing to the inner surface of the cellular glass substrate 7. The protrusion base 11 has an elliptical shape. The solid silicone protrusion body 13 extends from the protrusion base 11. The body 13 has a side wall 15 that extend from and are angled with respect to the protrusion base 11. The angled side wall 15 extends to the abutting surface 17. The abutting surface 17 has an elliptical shape. The abutting surface 17 has a smaller surface area than the protrusion base 11. As such, the protrusion 5 has a truncated elliptical cone shape. The angled side wall 15 may help to minimise contact with the corrodible surface and assist with removal of liquid from the corrodible surface.

The height of each protrusion 5 (namely the shortest distance between the abutting surface 17 and the protrusion base 11) is around 12 mm. The abutting surface 17 is substantially planar with the protrusion base 11, so the height of the protrusion 5 is substantially uniform. In this way, a gap of around 12 mm can be created between the cellular glass inner surface 7 and the outside surface of the component to be insulated.

The insulation material shown in FIG. 2 is designed to insulate a straight section of pipe with an external corrodible surface, such as a steel pipe. The pipe will typically have an external diameter approximately 12 mm less than the internal diameter of the half-pipe cellular glass substrate. In this way, the abutting surface 17 of each protrusion 5 may abut the external surface of the pipe without creating tension on the cellular glass material. In other words, the insulation material fits tightly on the pipe but is not so tight as to cause significant flexing of the cellular glass. In use, a second half-pipe section as shown in FIG. 2 is typically affixed to the same section of pipe to provide two insulation material pieces that surround the pipe.

FIG. 3 shows an insulation material 21 of the present invention that is similar to the insulation material in FIG. 2 but with a more complex structure to fit a more complex pipe system with multiple joints. The insulation material of FIG. 3 has several sections of differently shaped cellular glass joined together. The cellular glass has a straight half-pipe section 23 in the centre, a curved half-pipe section 25 on the left and a T-shaped half-pipe section 27 on the right.

A number of silicone rubber protrusions 29 are glued to the inner surface of the cellular glass substrate using a silicone-based adhesive. As in FIG. 2, the protrusions are arranged in rows with alternate rows off set with respect to the row before. The protrusions have the same shape and size as the protrusions in FIG. 2. In use, such an insulation material would be placed around a complimentary shaped pipe structure along with a second insulation material to surround and insulate the pipe structure. An air gap of approximately 12 mm is created between the insulation material and the outer corrodible (e.g. steel) surface of the pipe structure.

Figure 4A:
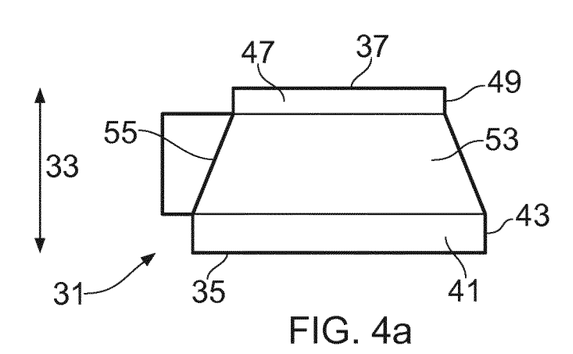
FIG. 4. shows schematic diagrams of protrusions useful in the insulation material described herein.
Figure 4B:
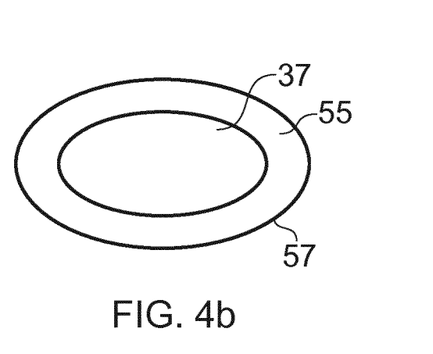
Figure 4C:
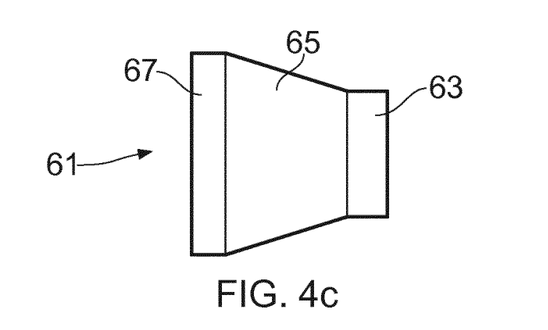
Figure 5:
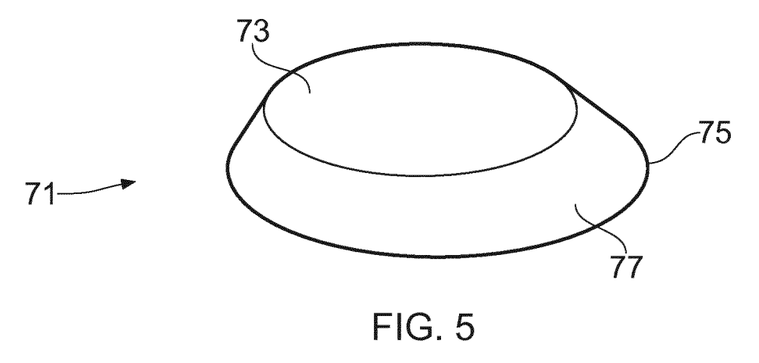
FIG. 5. shows a photograph of a silicone rubber protrusion useful in the insulation material described herein.
Figure 6:
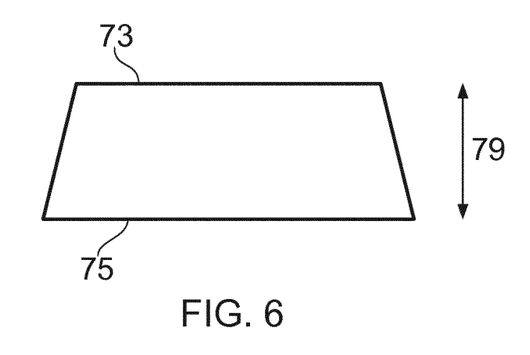
FIG. 6. shows a line drawing representation of the side view of the protrusion of FIG. 5.

FIGS. 4 to 6 show exemplary protrusions useful in the insulation material of the present invention.

FIGS. 4a and 4b show a side view and a top view of a protrusion 31 useful in the insulation material of the present invention. FIG. 4c shows an end view of a protrusion 61 that is similar to the protrusion shown in FIGS. 4a and 4b.

The side view (FIG. 4a) shows a height 33 of the protrusion 31 as the distance from the protrusion base 35 to the abutting surface 37. The height 33 of this protrusion 31 is approximately 12 mm. The side view also shows the protrusion body 39 is configured in three sections. A base section 41 is adjacent to the protrusion base 35. The protrusion base 35 forms one face of the base section 41. The base section 41 has the substantially same cross section as the protrusion base 35 over the height of the base section 41. A vertical side wall 43 of the base section 41 of the protrusion body 39 extends from the protrusion base 35. The side wall 43 of the base section 41 extends approximately 2.5 mm from the protrusion base 35. In other words, the base section 41 has a height of approximately 2.5 mm. The base section 41 has a cylindrical shape with an elliptical cross section (the shape of the protrusion base 35, discussed below). The base section 41 has a length of approximately 21 to 22 mm.

An abutting section 47 is adjacent to the abutting surface 37. The abutting surface 37 forms a face of the abutting section 47. The abutting section 47 has the substantially same cross section as the abutting surface 37 over the height of the abutting section 47. A vertical side wall 49 of the abutting section 47 of the protrusion body 39 extends from the abutting surface 37. The side wall 49 of the abutting section 47 extends approximately 1.5 mm from the abutting surface 37. In other words, the abutting section 47 has a height of approximately 1.5 mm. The abutting section 47 has a cylindrical shape with an elliptical cross section (the shape of the abutting surface 37, discussed below). The abutting section 47 has a length of approximately 13 to 14 mm.

An intermediate section 53 is positioned between the abutting section 47 and the base section 41. The abutting section 47 is adjacent to the intermediate section 53 on a face opposing the abutting surface 37. The base section 41 is adjacent to the intermediate section 53 on a face opposing the protrusion base 35. A side wall 55 of the intermediate section 53 extends from the side wall 49 of the abutting section 47 to the side wall 43 of the base section 41. The length and width of the base section 41 are larger than the length and width of the abutting section 47. As such, the side wall 55 of the intermediate section 53 is tapered. The length of the intermediate section 53 varies from approximately 13 to 14 mm adjacent to the abutting section 47 to approximately 21 to 22 mm adjacent to the base section 41.

The face of the intermediate section 53 adjacent to the abutting section 47 has the same cross section as the abutting section 47. The face of the intermediate section 53 adjacent to the base section 41 has the same cross section as the base section 41. The intermediate section 53 has a truncated conical shape with an elliptical cross section.

The shortest straight-line distance between the base section 41 and the abutting section 47 is approximately 8 mm. In other words, the height of the intermediate section 53 is approximately 8 mm. In this way, the overall height of the protrusion 31 is approximately 12 mm.

FIG. 4b shows a top view of the protrusion in FIG. 4a. The elliptical abutting surface 37 has a length of approximately 13 to 14 mm and a width of approximately 6.5 to 7 mm. The length of the abutting surface 37 (and the abutting section) is approximately twice the width of the width of the abutting surface (and the abutting section). The outline 57 of the elliptical protrusion base is shown in FIG. 4b. The protrusion base has a length of approximately 21 to 22 mm and a width of approximately 12 mm.

The centre of the abutting surface 37 coincides with the centre of the protrusion base 35. In this way, any load exerted on the abutting surface 37 can be transferred to the protrusion base 35 effectively and vice versa. The side wall of the abutting section and the side wall of the base section are not shown in this top view as these side walls are substantially perpendicular to the abutting surface and protrusion base, respectively. The intermediate section side wall 55 extends from the outline of the abutting surface 37 and abutting section to the outline 57 of the protrusion base and base section.

FIG. 4c shows an end view of a protrusion 61 useful in the present invention. The protrusion 61 of FIG. 4c is similar to the protrusion 31 of FIGS. 4a and 4b. The protrusion 61 has an abutting section 63, an intermediate section 65 and a base section 67. The abutting section 63 has a width of approximately 6.5 to 7 mm and a height of approximately 2.5 mm. The intermediate section 65 has a width that varies from approximately 6.5 to 7 mm adjacent to the abutting section 63 and a width of approximately 12 mm adjacent to the base section 67. The base section 67 has a width of approximately 12 mm and a height of approximately 1.5 mm.

FIGS. 5 and 6 show an alternative protrusion useful in the present invention. FIG. 5 is a photograph of a silicone rubber protrusion 71. The elliptical abutting surface 73 has a length of approximately 13 to 14 mm and a width of approximately 6.5 to 7 mm. The length of the abutting surface 73 is approximately twice the width of the width of the abutting surface 73. Part of the outline of the elliptical protrusion base 75 is shown. The protrusion base 75 has a length of approximately 21 to 22 mm and a width of approximately 12 mm.

The protrusion body 77 has a single section with a side wall 79 extending from the abutting surface 73 to the protrusion base 75. The length of the protrusion body 77 varies from approximately 13 to 14 mm adjacent to the abutting surface 73 and approximately 21 to 22 mm adjacent to the protrusion base 75. The width of the protrusion body 77 varies from approximately 6.5 to 7 mm adjacent to the abutting surface 73 to approximately 12 mm adjacent to the protrusion base 75.

FIG. 6 shows a schematic side view of the protrusion of FIG. 5. The planes of the abutting surface 73 and the protrusion base 75 are substantially parallel. The shortest distance between the abutting surface 73 and the protrusion base 75 (namely, the abutting surface height 79) is approximately 12 mm.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. An insulation material comprising an insulation material substrate with a substrate surface, the insulation material further having a plurality of protrusions affixed to or integrated into the substrate surface, each protrusion having an abutting surface distal to a protrusion base and a protrusion body connecting the abutting surface and the protrusion base, and each protrusion having an abutting surface height of at least 2 mm, wherein the abutting surface height is the shortest distance between the plane of the abutting surface and the plane of the protrusion base, wherein the protrusion body is comprised of a polymer, elastomer or rubber material, and wherein the protrusion body is comprised of a material having a Shore A hardness in the range of 30 to 50.

2. The insulation material according to claim 1 wherein the insulation material substrate includes cellular glass.

3. The insulation material according to claim 1 wherein the insulation material substrate has a hollow half-pipe shape.

4. The insulation material according to claim 1 wherein the abutting surface height is in the range of 5 to 15 mm.

5. The insulation material according to claim 1 wherein the abutting surface and the protrusion base form opposing faces of the protrusion body.

6. An insulation material comprising an insulation material substrate with a substrate surface, the insulation material further having a plurality of protrusions affixed to or integrated into the substrate surface, each protrusion having an abutting surface distal to a protrusion base and a protrusion body connecting the abutting surface and the protrusion base, and each protrusion having an abutting surface height of at least 2 mm, wherein the abutting surface height is the shortest distance between the plane of the abutting surface and the plane of the protrusion base, and wherein the protrusion body is comprised of silicone rubber.

7. The insulation material according to claim 1 wherein the surface area of the abutting surface is less than the surface area of the protrusion base and a side wall or side walls of the protrusion body taper from the protrusion base to the abutting surface at an angle between 105 to 135° with respect to the plane of the abutting surface.

8. The insulation material according to claim 1 wherein the protrusions are arranged in an array on the substrate surface and the density of protrusions on the substrate surface of the insulation material substrate is in the range of 1 protrusion per 4,000 to 40,000 $mm^2$.

9. An insulated component comprising a component with a corrodible outer surface and an insulation material according to claim 1, wherein the abutting surface of the protrusions of the insulation material abut the corrodible outer surface of the component to provide an air gap of at least 2 mm between the corrodible outer surface and the substrate surface of the insulation material substrate.

10. The insulated component according to claim 9 wherein the component is a pipe with a steel outer surface.

11. A method for producing an insulation material, wherein the method comprises the following steps:
   a. providing an insulation material substrate with a substrate surface; and
   b. affixing a plurality of protrusions to the substrate surface, each protrusion having an abutting surface distal to a protrusion base and a protrusion body connecting the abutting surface and the protrusion base, the protrusion base of each protrusion being affixed to the substrate surface, and each protrusion having an abutting surface height of at least 2 mm, wherein the abutting surface height is the shortest distance between the plane of the abutting surface and the plane of the protrusion base, wherein the protrusion body is comprised of a polymer, elastomer or rubber material, and wherein the protrusion body is comprised of a material having a Shore A hardness in the range of 30 to 50.

12. A method of insulating a component, the method comprising providing a component with a corrodible outer surface and positioning an insulation material to an outer surface of the component; the insulation material comprising:
   an insulation material substrate with a substrate surface, the insulation material further having a plurality of protrusions affixed to or integrated into the substrate surface, each protrusion having an abutting surface distal to a protrusion base and a protrusion body connecting the abutting surface and the protrusion base, and each protrusion having an abutting surface height of at least 2 mm, wherein the abutting surface height is the shortest distance between the plane of the abutting surface and the plane of the protrusion base, wherein the protrusion body is comprised of a polymer, elastomer or rubber material, and wherein the protrusion body is comprised of a material having a Shore A hardness in the range of 30 to 50.

13. The method according to claim 12, wherein the insulation material substrate includes cellular glass.

14. The insulation material according to claim 13, wherein the insulation material substrate has a hollow half-pipe shape.

15. The insulation material according to claim 14 wherein the abutting surface height is in the range of 5 to 15 mm.

16. The insulation material according to claim 15 wherein the abutting surface and the protrusion base form opposing faces of the protrusion body.

17. The insulation material according to claim 6 wherein the insulation material substrate includes cellular glass.

18. The insulation material according to claim 6 wherein the insulation material substrate has a hollow half-pipe shape.

19. The insulation material according to claim 6 wherein the abutting surface height is in the range of 5 to 15 mm.

20. The insulation material according to claim 6 wherein the abutting surface and the protrusion base form opposing faces of the protrusion body.

21. The insulation material according to claim 6 wherein the surface area of the abutting surface is less than the surface area of the protrusion base and a side wall or side walls of the protrusion body taper from the protrusion base to the abutting surface at an angle between 105 to 135° with respect to the plane of the abutting surface.

22. The insulation material according to claim 6 wherein the protrusions are arranged in an array on the substrate surface and the density of protrusions on the substrate surface of the insulation material substrate is in the range of 1 protrusion per 4,000 to 40,000 mm$^2$.

23. An insulated component comprising a component with a corrodible outer surface and an insulation material according to claim 6, wherein the abutting surface of the protrusions of the insulation material abut the corrodible outer surface of the component to provide an air gap of at least 2 mm between the corrodible outer surface and the substrate surface of the insulation material substrate.

24. The insulated component according to claim 23 wherein the component is a pipe with a steel outer surface.

25. A method for producing an insulation material, wherein the method comprises the following steps:
  a. providing an insulation material substrate with a substrate surface; and
  b. affixing a plurality of protrusions to the substrate surface, each protrusion having an abutting surface distal to a protrusion base and a protrusion body connecting the abutting surface and the protrusion base, the protrusion base of each protrusion being affixed to the substrate surface, and each protrusion having an abutting surface height of at least 2 mm, wherein the abutting surface height is the shortest distance between the plane of the abutting surface and the plane of the protrusion base, and wherein the protrusion body is comprised of silicone rubber.

26. A method of insulating a component, the method comprising providing a component with a corrodible outer surface and positioning an insulation material to an outer surface of the component; the insulation material comprising:
  an insulation material substrate with a substrate surface, the insulation material further having a plurality of protrusions affixed to or integrated into the substrate surface, each protrusion having an abutting surface distal to a protrusion base and a protrusion body connecting the abutting surface and the protrusion base, and each protrusion having an abutting surface height of at least 2 mm, wherein the abutting surface height is the shortest distance between the plane of the abutting surface and the plane of the protrusion base, and wherein the protrusion body is comprised of silicone rubber.

27. The method according to claim 26, wherein the insulation material substrate includes cellular glass.

28. The insulation material according to claim 27, wherein the insulation material substrate has a hollow half-pipe shape.

29. The insulation material according to claim 28 wherein the abutting surface height is in the range of 5 to 15 mm.

30. The insulation material according to claim 29 wherein the abutting surface and the protrusion base form opposing faces of the protrusion body.

* * * * *